United States Patent [19]

Kaneyama et al.

[11] 3,979,041

[45] Sept. 7, 1976

[54] CLAMPING MECHANISM FOR LINE-UP OF PIPES

[75] Inventors: Kiyoshi Kaneyama; Masashi Nakamura; Takanobu Murakami, all of Kanagawa, Japan

[73] Assignee: Nippon Kokan Kabushiki Kaisha, Tokyo, Japan

[22] Filed: Feb. 11, 1975

[21] Appl. No.: 549,003

[30] Foreign Application Priority Data

July 13, 1974 Japan.............................. 49-79743

[52] U.S. Cl................................ 228/49; 228/44.5; 228/212
[51] Int. Cl.²...................................... B23K 31/02
[58] Field of Search .............. 228/49, 50, 212, 213, 228/216, 44.5; 29/200 P, 272

[56] References Cited
UNITED STATES PATENTS

| | | | |
|---|---|---|---|
| 3,561,320 | 2/1971 | Nelson | 29/272 X |
| 3,699,635 | 10/1972 | Bradley et al. | 29/272 X |

Primary Examiner—Al Lawrence Smith
Assistant Examiner—Margaret Joyce
Attorney, Agent, or Firm—Moonray Kojima

[57] ABSTRACT

An apparatus comprising a round-like housing having two assemblies therein. In one assembly there is a group of extending members each having affixed thereto metal backing members, which are alternatively either segment-like or inverted segment-like and have mounted a pair of rollers facing each other across a weld backing strip, the extending members being movable and workable in alternative shifts. In the other assembly the extending members each have affixed thereto a roller, the extending members being movable and workable all in one movement. There are fluid cylinder mechanisms in the assemblies for moving the members in the above-mentioned manner. The aligning, the expanding and the welding of pipes are easily and stably accomplished by such apparatus performed without need of any tack welding.

5 Claims, 11 Drawing Figures

FIG_9

CLAMPING MECHANISM FOR LINE-UP OF PIPES

This invention relates to an improvement of equipment for welding pipes, and more particularly, for making easier and more stable the aligning, the expanding and the automatic normal welding of the pipes without need of any tack welding at the scene of laying-down.

It is, in general, well-known that many troubles occur and prodigious labor is required for aligning pipes to be welded, for matching the two groove faces thereof and for backing the welding zones to provide proper penetrating bead and to prevent melt-down in butt welding line-pipes or water-pipes to be laid, especially in automatic welding. Therefore, various means have been employed to solve the foregoing problems. For example, the CRC-CROSE's equipment or the equipment of Japanese Patent publication, Shown 49-4148 is one means of solving such problem. In the above cases, the former comprises an internal clamp mechanism and includes no backing device. Accordingly, centering of pipes may be achieved. However, burn-through the melt zone is difficult to prevent. At the same time, matching of both weld zones or expanding of the pipe was difficult to achieve, since the clamping system was applied at a distance far from the weld zone. The latter equipment also has a clamp mechanism and backing device. It is needless to say that the preventing of the melt-down and the forming of the penetrating bead are impossible to achieve. The main difficulty of the above clamping mechanism lies in that some gap occurs in both adjacent segments dividing the circumference to clamp at the stage of extending the member, which tends to bring about the melt-down therein. This results in excess penetration between said adjacent segments, and consequently unclamping may be impossible to be carried out. And what is worse, the extending tolerance range for a diameter of pipe to be welded is very narrow. Accordingly, the above extending mechanism cannot be applied to a welding pipe regardless of the diameter thereof. Thus, it can be stated that the prior equipment are partial to the clamping mechanism for a welding pipe. Consequently, the aligning of both pipes, the matching of both groove faces and the forming of penetrating bead cannot be achieved in a good manner.

This invention has been developed to overcome the above mentioned difficulties. The features lie in a construction comprising a substantially round housing, divided extending members arranged along with the outside and the inside of the housing as movable and workable in every other shift on the concyclic, a segment-like metal backing fixed to each of one set of shift members and an inverted segment-like metal backing fixed to each of another set of shift members, and a fluid cylinder mechanism connected to each of the members.

An object of this invetion is to provide an improved welding equipment for pipes, in which the aligning of two pipes, expanding of both welding pipes and the matching of both groove faces thereon are easily and stably possible to be achieved.

Another object of this invention is to provide an improved equipment which may be employed at the site of installation of the pipes regardless of location, such as, overland or maritime, and regardless of the size of the pipes.

Other objects and advantages will be apparent from the following description and with the accompanying drawings in which.

Figure 8:
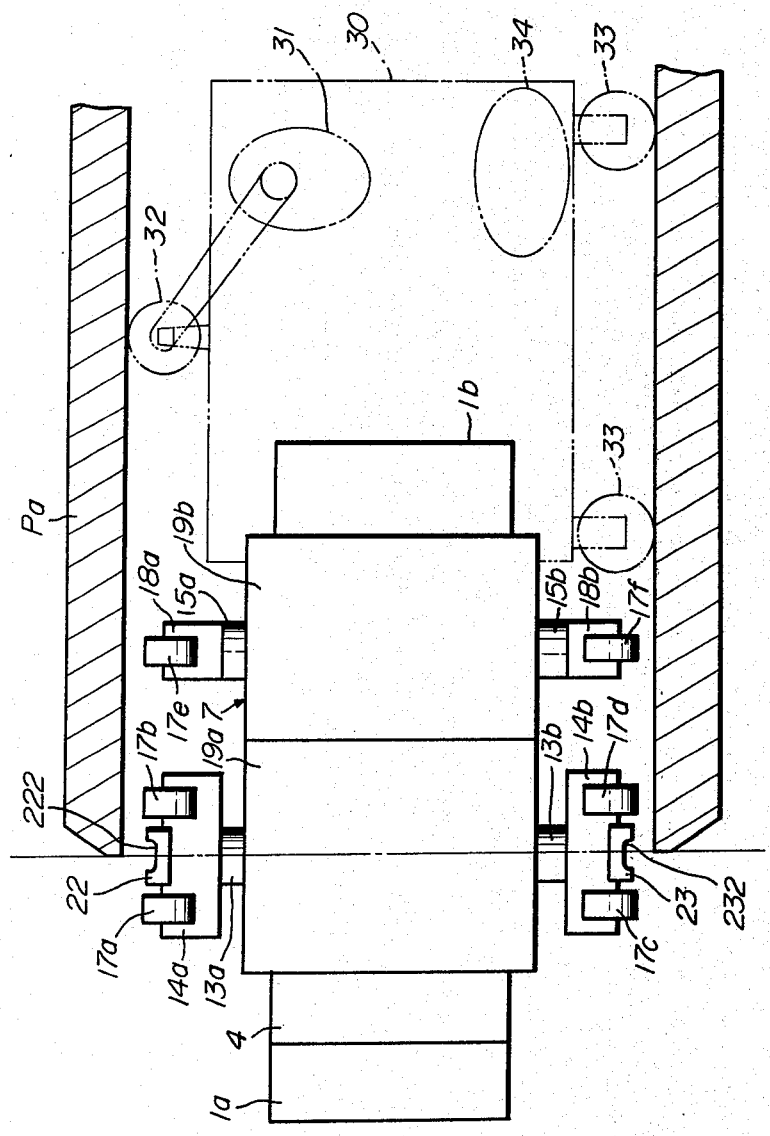
Figure 9:
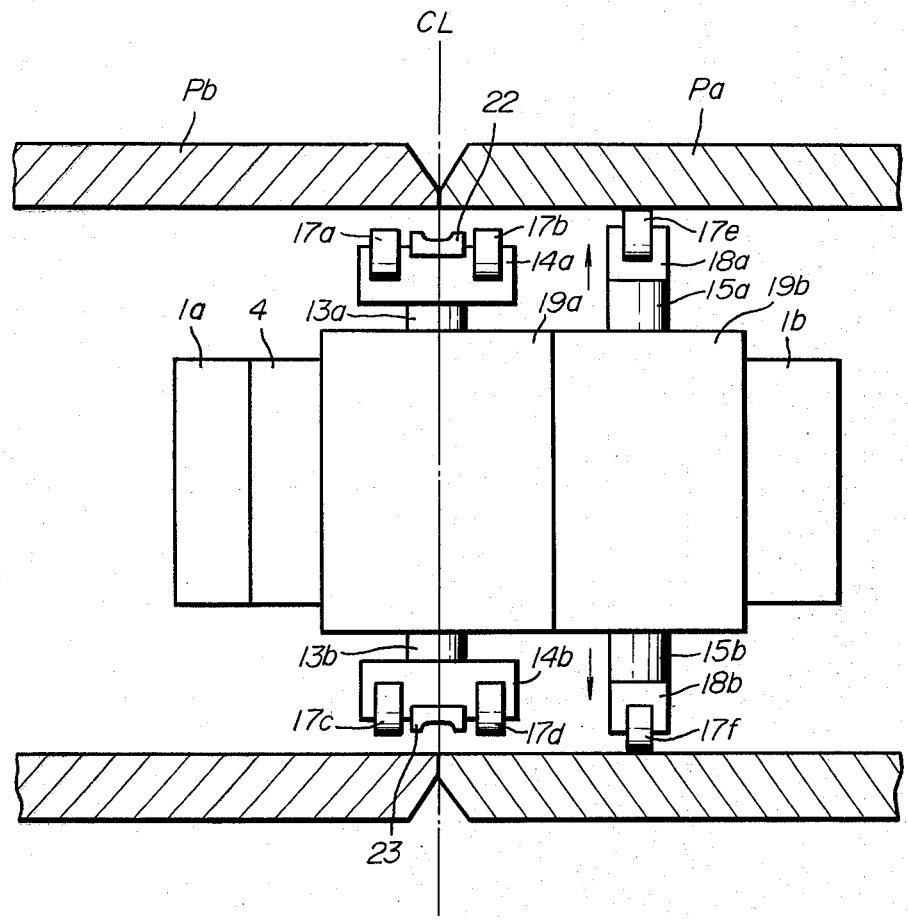
Figures 10, 11:
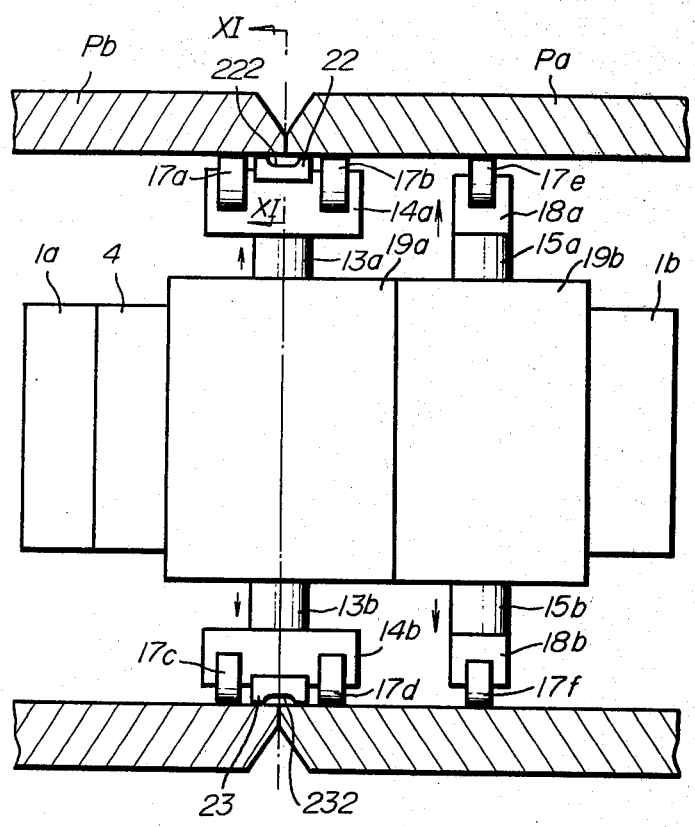

FIG. 8 to FIG. 10, respectively, are explanatory views on operating manner of the above equipments by stages.

FIG. 11 is the sectional view of FIG. 10 XI — XI line.

Referring now to the accompanying drawings numeral 7 is a round-like housing comprising a pair of bowl-like or cylinder-like assemblies 19a and 19b, wherein one facing end thereof is connected to each other. In such assemblies 19a and 19b a plurality of guide holes are made in each of the assemblies, e.g. 25a, 25b and others (in the drawings, 20 holes in total), on the concyclic and with uniform spacing. On the one hand, a guide rod 15a or 15b is put into each of the above guide holes at the side of the assembly 19b, e.g. 25b and others, in such a manner as all of the holes are on the same radius direction in a normal condition. On the other hand, a guide rod 13a or 13b, having a different projection length, in a normal condition, is put into each of the holes, e.g. 25a and others in the side of other assemblies 19a, in shifts.

A fluid cylinder 1b for clamping in which a piston 2b is put is fixed to the rear end of the above assembly 19b and the rear end of a piston rod 21 running at its front end through the bearing of the above assembly 19b is fixed to such piston 2b, while independent two fluid cylinders 1a and 4 are fixed to the rear end of the assembly 19a. The rear end of a long piston rod 3 reaching the above assembly 19b passing through the center line of the assembly 19a is fixed to another piston 2a put into the above fluid cylinder 1a. At the same time, the front end of said piston rod 3 is put into a hollow portion 211 formed in the front end of the above piston rod 21. With such mechanisms, an advancing pair is formed and a bending tendency may be avoided by such a support for both ends. Moreover, a ring-like piston 5 is put into the above fluid cylinder 4 and one end of a hollow piston rod 6 sliding along with the outside of the above long piston rod 3 is fixed to the piston 5.

A star hub 9 forming plural tooth-like projections, 91 and others (in FIG. 2, ten teeth in total), on the concyclic and with uniform spacing is mounted on the middle of the above piston rod 3 and a groove 92 is made in each of the tooth-like projections. In such a groove 92, the lower end of a crank arm 11a is fixed to the hub 9 by a pin 10a while the upper end of such an arm 11a is fixed to the above mentioned guide rod 13a by a pin 12a. With action of such a mechanism, that is, up and down action of the arm 11a depending upon the advance or retreat of the piston rod 3, the guide rod 13a is movable toward the radius direction of the housing.

On the other hand, a bowl hub 8 is mounted to the front end of the above-mentioned piston rod 6 and another tooth-like projections 81 and others (in FIG. 2, ten teeth in total), which are engaged with cores, 93 and others, formed between the above tooth-like projections respectively are formed on the periphery of the hub 8 facing the above-mentioned hub 9. A groove 82 is made in the center of each of such tooth-like projections 81 and others, and one end of another crank arm 11b is fixed thereto by a pin 10b. With such a mechanism, a turning pair may be formed. And moreover, the other end of the crank arm 11b is fixed to the above-mentioned guide rod 13b by a pin 12b and thereby, the guide rod 13b may be moved toward the radius direction regardless of the action of another guide rod 13a by the up and down actions of the crank arm 11b depending upon movement of the above piston rod 6. In another place, another bowl hub 20 is mounted on the middle of the above-mentioned piston rod 21 in a manner as facing the above bowl hub 8 and plural projections 201 and others (twenty projections in total) are formed on the periphery of the hub 20 with uniform spacing. A groove 202 is made in each of the projections and the lower end of another crank arm 11c fixed thereto is put into such a groove to be fitted therein. With such a mechanism, the turning pair is easily formed.

Furthermore, an outlet and an inlet for feeding some fluid, i.e., 26a – 27a, 26b – 27b and 26c – 27c, are made for the above-mentioned fluid cylinders, 1a, 1b and 4.

Figure 1:
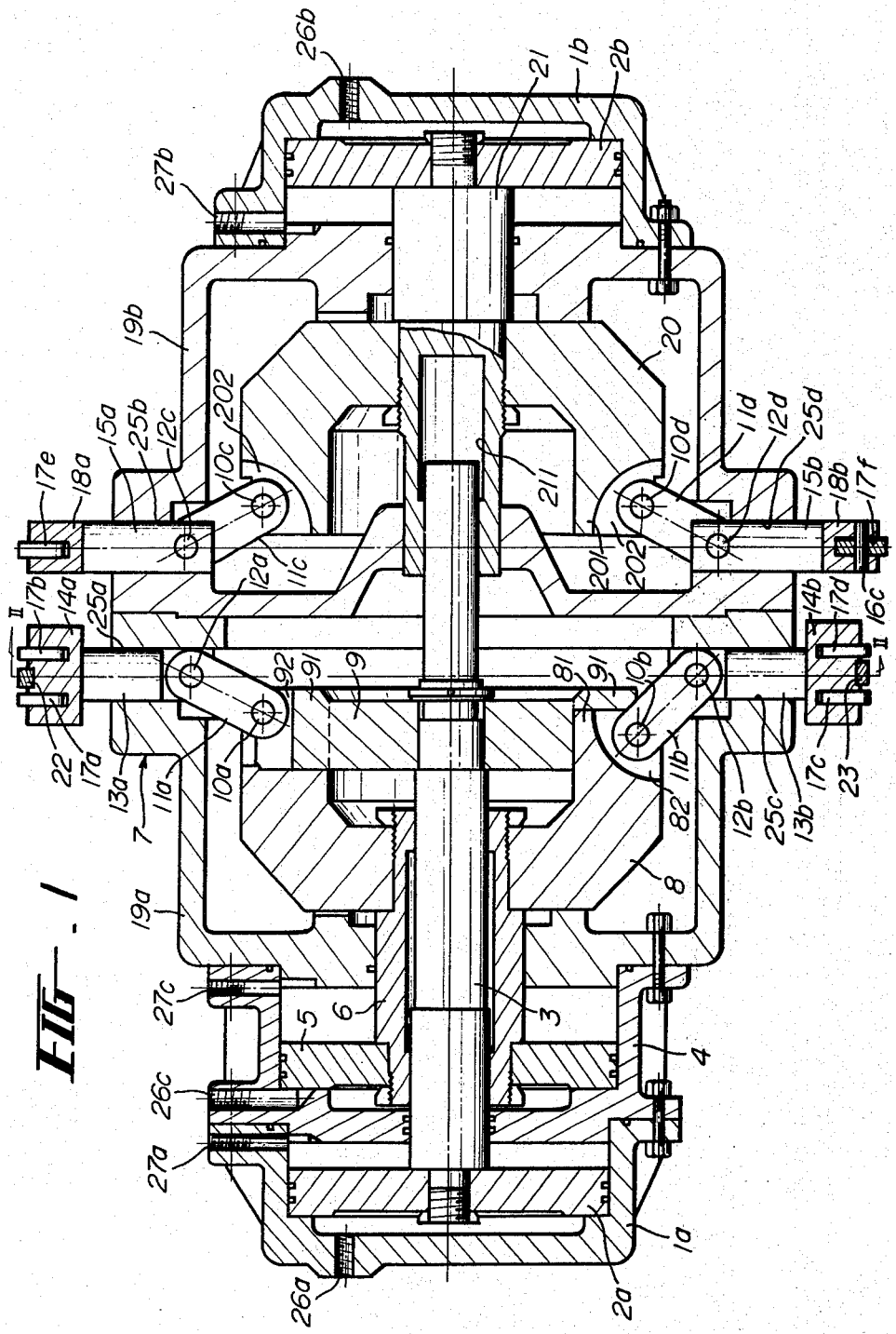
FIG. 1 is a sectional side view of one example based on this invention.
Figure 6:
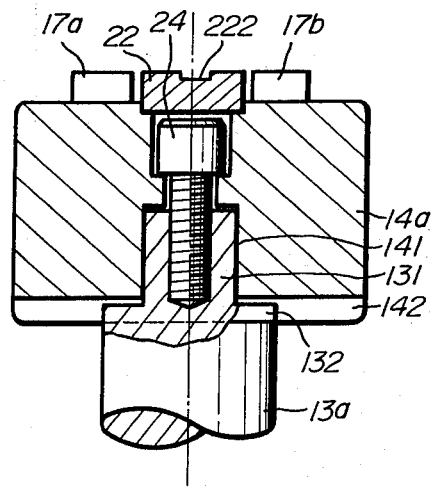
FIG. 6 is the sectional view of FIG. 2 VI — VI line.

As shown in FIG. 1 the extending members 14a and 14b made as a block respectively, which serves as a backing at the welding stage, are mounted to the external end of the above-mentioned guide rods 13a and 13b in the assembly 19a. At another place, another set of extending members 18a and 18b made as a block respectively, which are used for clamping at the welding stage, are mounted to the another guide rods 15a and 15b. An example of mounting is shown in FIG. 6. That is, a notch portion 141 is provided at the bottom side of the extending member 14a and the upper projection 131 of the guide rod 13a is set into the notch 141. Then, the following procedure is employed to check a degree of freedom for rotating of the guide rod 13a. First, a cut portion 132 is made in the step portion of the guide rod 13a. Secondly, a groove 142 in which the cut portion 132 is set is made. Thirdly the extending member 14a is fixed to such a guide rod 13a by a bolt 24 as both of them are set in. With such a mechanism, the above degree of freedom is surely possible to be checked. This procedure is employed also in relation between other extending members and guide rods.

Figure 2:
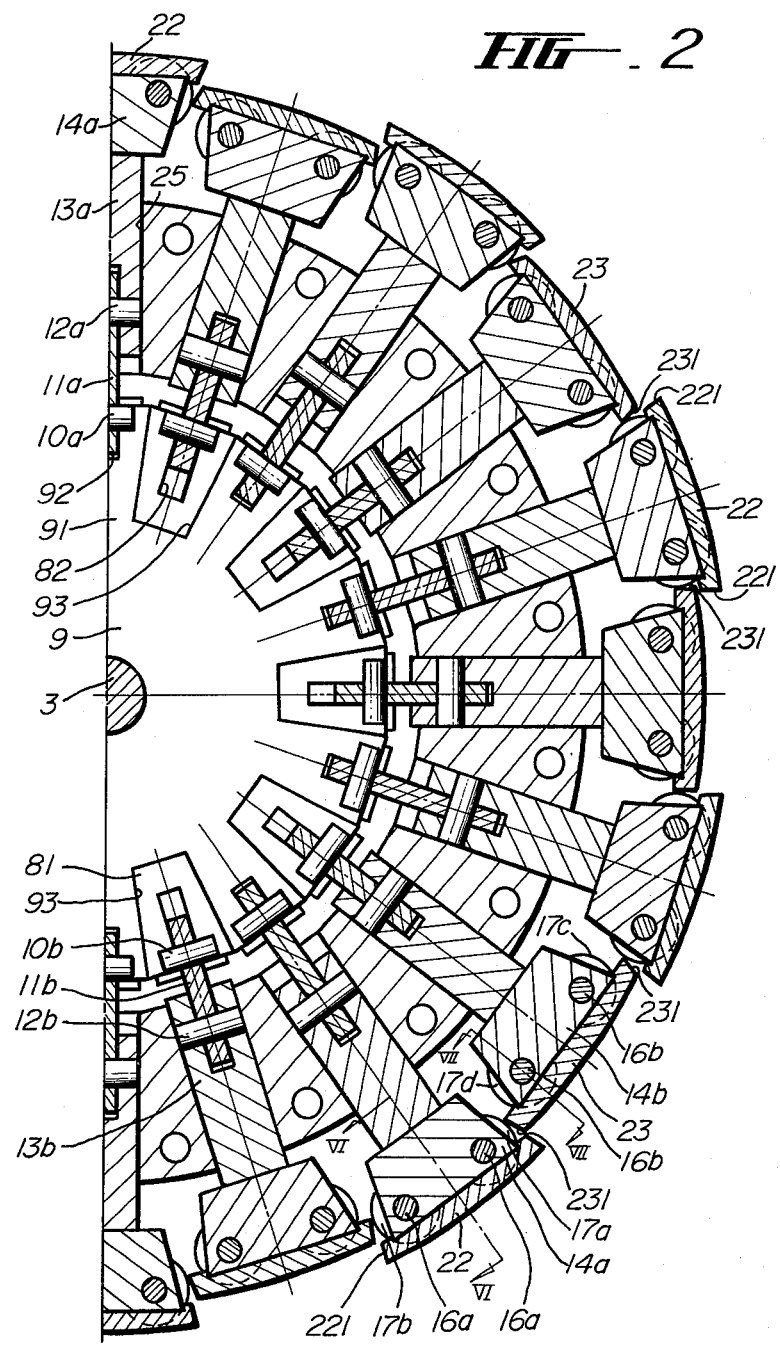
FIG. 2 is the sectional front view of FIG. 1 along II — II line.
Figure 3:
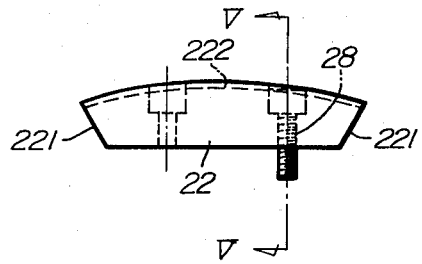
FIG. 3 is one example of metal backing by this invention.
Figure 4:
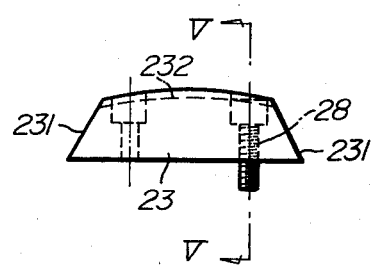
FIG. 4 is another example of the metal backing.
Figure 5:
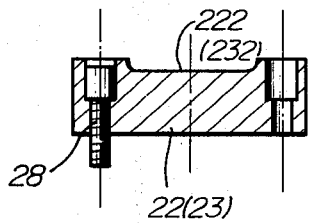
FIG. 5 is the sectional view of FIG. 3 and FIG. 4 along V — V line.

On each of the above extending members, 14a and others, placing outside in a normal condition, a metal backing, 22 and others, having a segment-like side, is fixed by bolts 28 and others as shown in FIG. 2 and FIG. 3 respectively. At the same time, on each of the above extending members, 14b and others, placing inside in a normal condition, another metal backing 23 and others, having an inverted segment-like side, are fixed in the same manner. In the above-mentioned mechanisms, both sides of each of the segment-like metal backing, 22 and others, are finished as a taper face 221 respectively and and both sides of each of the inverted segment-like metal backings, 23 and others, are finished as an inverted taper face 231 respectively, as shown in FIG. 3 and FIG. 4. Accordingly, the facing sides of the adjacent metal backings closely come into contact with each other and becomes a full circle being equal to the internal circumference of the pipe to be welded. In such a case, it is needless to say that the shape of such a backing strip should be selected and changed depending upon the internal circumferences of the pipe to be welded. Moreover, a groove 222 for forming good penetrating bead is made at the center of the top face of the metal backing 22, or 232 for the inverted metal backing 23 as shown in FIG. 5.

Figure 7:
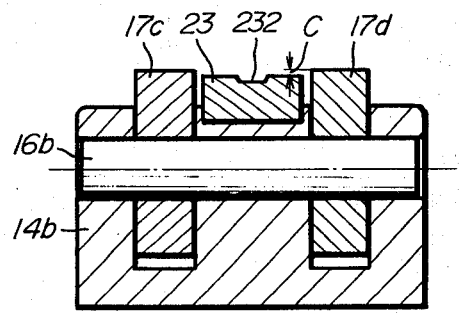
FIG. 7 is the sectional view of FIG. 2 VII — VII line.

In this invention, a mechanism of expanding the welding pipes is as follows. That is, first, a pair of roller is positioned to each of the above-mentioned extending members facing each other across the above metal backing. That is a pair of rollers 17a and 17b for the segment-like metal backing 22 or a pair of rollers 17c and 17d for the inverted segment-like metal backing 23, as shown in FIG. 1, FIG. 6 and FIG. 7. These enlarging and reforming rollers are rotatably fixed to the extending members by a pin, e.g., 16b in FIG. 7. At another place, another set of enlarging and reforming rollers, e.g. 17e 17f, are also rotatably fixed to the center of the top face each of the above-mentioned extending members for clamping the pipe by a pin, e.g. 16c, as shown in FIG. 1. In the above mechanism, it will be desirable for actual welding operation that the level of the top face of the metal backings be lowered against that of the roller, e.g. by about 0.2mm. Since the quality of the employed metal backing is, in general, soft, there may be uneven penetrating bead may occur and there may result a shortening of the useful life longevity by deformation and abrasion of the metal backing based on direct contact between the two.

The driving system employed in this invention needs no special means. That is, either a travelling wheel system or a pulling wire system may be employed. A mechanism as shown in FIG. 8 is one of the examples of a travelling wheel system. In FIG. 8, a truck 30 is set up to the above-mentioned housing 7. Then, a driving mechanism 31 including a motor, a reduction gear and the like; travelling rollers, e.g. 32 and others, and wheels, e.g. 33 and others; an accumulator 34 for fluid; a positioning means and remote control systems (not shown in the drawings) are arranged at a suitable place.

The operating manner and function of this invention are as follows. First, the above-mentioned equipments are put into the already laid-down pipe Pa as a whole, and travels to and stops on a position wherein the centerline of grooves 222, 232 and others, on the metal backings 22, 23 and others agrees with the weld groove line. At this state, the fluid 27b for the fluid cylinder 1b fed into the gate-way 19b, which is opened, and fluid is fed into another gate-way 26b. By such an operation, the piston rod 21 and the bowl hub 20 mounted thereon advance to the left from the position as shown in FIG. 1. At the same time, every crank arm 11c and others rise and then every guide rods 15a, 15b and others are pushed out in the radius direction all together. As a result, the rollers 17e, 17f and others, set on each of the extending members 18a, 18b and others, act to enlarge and reform the pipe Pa, all in one body. Such a state is as shown in FIG. 9. Then another pipe Pb to be welded is set up in a manner of FIG. 9.

At another place, the fluid gateway 27a for another fluid cylinder 1a set into the assembly 19a, is opened and fluid is fed into the gateway 26a. By such an operation, the piston rod 3 advances to the right and into the hollow portion of the above piston rod 21 and the star hub 9 mounted thereon also advances. This action causes every crank arm 11a, 11b and others to be raised, and pushes out every guide rods 13a, 13b and others, in the radius direction all together. As a result, the rollers, i.e., a pair of 17a and 17b and others, set on each of the extending members i.e., 14a, 14b and others, act to enlarge and reform a newly introduced pipe Pb all in one body and to position the metal backings at each of the grooves. After such a state is confirmed, the fluid gateway 27c for the third cylinder 4 is opened and fluid is fed into from another gateway 26c. By these operations, the hollow-like piston rod 6 advances to the right under the guiding of the piston rod 3 at the same time, the bowl hub 8 advances and the tooth-like projections 81 and others, formed on the periphery of the hub 8 are engaged with the cores, 93 and others, of the above star hub 9 advancing to the required position. At this time, every guide rods, 13b and others, are pushed out in the radius direction through the crank arm 11b and others, and every extending members 14b and others, are moved from the position as shown in FIG. 2 to the position of each of the above mentioned metal backings 14a, which is already positioned at the required place, altogether. By this operation, a pair of rollers 17a and 17b, 17c and 17d, and others enlarge and reform the pipe Pb as well as that of the above mentioned pipe Pa by the rollers, i.e., 17e, 17f and other, all in one body. In such a case, the inverted taper faces 231 and others, slide along with the taper faces, i.e., 221 and others, respectively, and a full circular periphery is formed in which there is no gap between the adjacent metal backings as shown in FIG. 1, facing the center into of the prepared grooves. This state is shown in FIG. 10. Thus the first feature of this invention lies in the segment-like backings and inverted segment-like metal backings being alternately arranged to form a full circular periphery being equal to the internal circumference of a welding pipe by extending members on which the backings are set respectively and which work all in one body alternately as one shift. And then the second feature of this invention lies in the pair of rollers mounted to the extending member facing each other across each of the metal backings in one assembly of the weld housing and a roller mounted to each of a group of the extending members in another assembly thereof. The assemblies align and expand both a pipe to be newly welded and the pipe already being laid down in mutual cooperation by extending the above members, all in one body. In such a manner, a normal automatic butt-welding is carried out. After welding the equipment is returned to the starting condition as shown in FIG. 1 by inverting the above-mentioned procedure, specially the operating of the gateways. In addition, a manual welding operation on the above-mentioned equipment is possible to be carried out by merely removing the metal backings from the extending members.

We claim:
1. An apparatus for aligning, expanding and welding pipes, comprising
   a pair of cylindrical housings;
   a first assembly in one of said housings, comprising a plurality of first members extending in a radial direction, metal backing means affixed to each of said first members, roller means on each of said first members, and means for moving alternate ones of said first members in radial direction;
   a second assembly in the other of said housings, comprising a plurality of second members extending in a radial direction and means for moving all of said second members together in said radial direction; and
   driving means, including hydraulic means, for driving said first and second members.

2. The apparatus of claim 1, wherein said metal backings are of two types, segment shaped and inverted segment shaped, each of the two types being alternately affixed to said first extending member thereby to form at the outer ends thereof a circumference substantially equal to the inner circumference of said pipes.

3. The apparatus of claim 2, wherein said rollers mounted on each of said first members comprises a pair of rollers disposed facing each other across said metal backing in said first assembly.

4. The apparatus of claim 1, wherein both said assemblies are connected to each other at the respective peripheries.

5. The apparatus of claim 4, wherein said first assembly comprises a long piston rod, a star hub mounted at the middle thereof and crank arm means connected to each of said first extending members said segment type metal backings to respective alternate first members and a first bowl hub, a hollow piston wherein said long rod is dispose therethrough and crank arm means in said first bowl hub connected to each of said first extending members to affix said inverted segment type metal backings to respective alternate first members; and said second assembly comprises another piston rod within which said long piston rod is slidable, a second bowl hub mounted thereto and engagable with said first bowl hub connected to each of said second extending members through crank arm means.

* * * * *